United States Patent [19]

Jones

[11] 4,235,972
[45] Nov. 25, 1980

[54] HIGH CRUSH STRENGTH HETEROGENEOUS ION EXCHANGE RESINS OF CROSSLINKED POLYMERS HAVING VINYL HALIDE MONOMER POLYMERIZED THEREIN

[75] Inventor: Giffin D. Jones, Midland, Mich.

[73] Assignee: The Dow Chemical Company, Midland, Mich.

[21] Appl. No.: 13,854

[22] Filed: Feb. 22, 1979

[51] Int. Cl.$^2$ .............................................. C08L 27/08
[52] U.S. Cl. ....................................... 521/28; 521/38; 525/239
[58] Field of Search .................. 521/38, 28; 526/343, 526/17; 525/239

[56] References Cited

U.S. PATENT DOCUMENTS

| | | | |
|---|---|---|---|
| 2,899,405 | 8/1959 | Coover, Jr. ......................... | 260/884 |
| 3,332,890 | 7/1967 | Hatch .................................. | 260/884 |
| 3,548,034 | 12/1970 | Cleemann et al. ................. | 260/884 |
| 3,632,679 | 1/1972 | DeWitt et al. ...................... | 260/884 |
| 4,152,496 | 5/1979 | Barrett et al. ...................... | 521/38 |

*Primary Examiner*—Joseph L. Schofer
*Assistant Examiner*—Peter F. Kulkosky

[57] ABSTRACT

Ion exchange resins exhibiting increased crush strength and/or higher density are prepared from a cross-linked polymer by imbibing a halo-substituted olefin within the cross-linked polymer's structure and subsequently polymerizing the imbibed olefin. For example, imbibing vinylidene chloride within a chloromethylated, cross-linked copolymer of styrene and subsequently polymerizing the vinylidene chloride forms a high density resin, which resin is useful in the preparation of ion exchange and chelate type resins having improved crush strength.

21 Claims, No Drawings

HIGH CRUSH STRENGTH HETEROGENEOUS ION EXCHANGE RESINS OF CROSSLINKED POLYMERS HAVING VINYL HALIDE MONOMER POLYMERIZED THEREIN

BACKGROUND OF THE INVENTION

This invention relates to heterogeneous ion exchange resins of a cross-linked polymer and a halo-substituted olefin.

Ion exchange resins are normally solid materials which generally carry exchangeable ions. Due to their ability to exchange ions in a liquid without substantial alteration of the solid resin's structure, they are widely employed in recovery processes such as the recovery of uranium and in waste treatment to remove undesirable components from water.

Generally, effective ion exchange resins are substantially insoluble but swellable to a limited degree in water and are resistant to physical deterioration such as excessive spalling and shattering. Moreover, in many applications, particularly up-flow column operations, often encountered in uranium recovery and sugar processing, the resin advantageously has a sufficiently high density to assure efficient removal of the valuable ionic ingredients from the ion containing liquid, which is generally a thick slurry, without entrainment loss of the resin.

Conventionally, ion exchange resins are prepared by (1) haloalkylating a copolymer of a monovinylidene aromatic such as styrene and a cross-linking agent which is generally a polyvinylidene aromatic such as divinylbenzene in the presence of a Friedel-Crafts catalyst and (2) attaching ion active exchange groups to the halogenated product. For example, an anion exchange resin is prepared by aminating the haloalkylated polymer. See, *Ion Exchange* by F. Helfferich, published in 1962 by McGraw-Hill Book Company, New York. Unfortunately, these anion exchange resins, without modification, possess relatively low densities.

Ion exchange resins having increased density are known in the art. For example, U.S. Pat. Nos. 2,769,788 and 2,809,943 disclose higher density ion exchange resins prepared by incorporating inert, finely divided solid materials of a high density, i.e., 2.5 g/cc or higher, into copolymer beads of the monovinylidene and polyvinylidene aromatic compounds. Unfortunately, these ion exchange resin beads exhibit excessive spalling and surface irregularities. Moreover, such beads have a low mechanical stability and have a tendency to break and spall when employed in a continuous operation.

To increase the mechanical stability of high density ion exchange resin beads, German Patent Application No. 2,218,126 teaches higher density resins can be prepared by using a nonionic substituted styrene, such as monochlorostyrene, as the monovinylidene aromatic compound. Unfortunately, halogenated non-ionic substituted styrenes are relatively expensive and of limited availability.

In view of the stated deficiencies of the known ion exchange resins having increased density and the methods for their preparation, it remains highly desirable to provide an improved heavy density ion exchange resin.

SUMMARY OF THE INVENTION

Accordingly, the present invention is a heterogeneous ion exchange resin of (1) a cross-linked polymer having a plurality of active ion exchange groups pendant thereto and (2) an amount of a polymerized halo-substituted olefinic monomer (hereinafter referred to as a halo-olefin) sufficient to increase the density and/or improve the crush strength of the resin.

In another aspect, the present invention is a method for preparing a heterogeneous ion exchange resin. In said method, a cross-linked polymer imbibes an amount of a halo-olefin sufficient to increase the density and/or improve the crush strength of the heterogeneous ion exchange resin. The imbibed halo-olefin is subsequently polymerized within the cross-linked polymer. Either before or after the imbibition of the halo-olefin, active ion exchange groups are attached as pendant groups to the cross-linked polymer.

Surprisingly, the novel ion exchange resins of the present invention exhibit increased density and/or improved crush strength without a substantial reduction in their subsequent ion exchange activity. As such, gel or macroporous anion exchange resins, chelate type resins or weak acid resins having excellent capacities and an increased density or improved crush strength are provided.

Among numerous other uses, the heterogeneous ion exchange resins of this invention are useful for removing electrolytes from water and other liquids in such operations as desalting, demineralizing and other purification processes. The heterogeneous anion exchange resins exhibiting increased densities are particularly useful in the removal of uranium from solution and the removal of ash and acidity from sugar solutions.

DETAILED DESCRIPTION OF PREFERRED EMBODIMENTS

In general, the heterogeneous ion exchange resins of the present invention are characterized as having a halo-olefin polymerized within a normally solid cross-linked polymer bearing pendant active ion exchange groups. By the term "polymerized within" it is meant that the polymerized halo-olefin is physically and/or chemically attached to the cros-linked polymer and is contained within the cross-linked polymer's structure.

The distribution of the halo-olefinic polymer within the cross-linked polymer may vary. For example, the halo-olefinic polymer may be grafted to groups pendant to the polymer chain, and, as such, become chemically attached to the cross-linked polymer. When the halo-olefin is imbibed by a haloalkylated cross-linked polymer and subsequently polymerized therein, the resulting halo-olefinic polymer is believed to be so chemically attached to the cross-linked polymer. Alternatively, the halo-olefinic polymer, while not being chemically attached to the cross-linked polymer, may constitute one or more distinct regions within the heterogeneous resin, e.g., the heterogeneous resin may have one or more regions of the halo-olefinic polymer dispersed in a continuous region of the solid polymer. On the other hand, the halo-olefinic polymer may constitute an essentially continuous web-like region which fills the interstices of the cross-linked polymer. In many cases, combinations of the above-mentioned distribution or other distributions may be present in the heterogeneous resin. Unless otherwise provided herein, the distribution of the halo-olefinic polymer within the cross-linked polymer is not particularly critical to the invention.

In general, the cross-linked polymers forming the resins of the present invention are the addition copolymerization product of a polymerizable monoethylenically unsaturated monomer and a cross-linking agent copolymerizable therewith; typically, a polyethylenically unsaturated monomer.

Kinds of polymerizable monoethylenically unsaturated monomers, cross-linking agents, catalysts, polymerization media and methods for preparing the cross-linked addition copolymers as granules or in spheroidal bead form, of the gel or macroporous type, are well known in the art and reference is made thereto for the purposes of this invention. Illustrative of such are U.S. Pat. Nos. 2,960,480; 2,788,331; 2,642,417; 2,614,099; 2,591,573 for conventional gel type materials and U.S. Pat. Nos. 3,637,535; 3,549,562 and 3,173,892 for the more porous materials, i.e., the so-called macroporous material, all of which are hereby incorporated by reference. Of the known polymerizable monoethylenically unsaturated compounds, the monovinylidene aromatics such as styrene; monoalkyl substituted styrenes, e.g., vinyl toluene and ethyl vinylbenzene; and vinylnaphthalene are preferred in this invention, with styrene and vinylnaphthalene being most preferred. Preferred cross-linking agents include the polyvinylidene aromatics such as divinylbenzene, divinyl toluene, divinyl, xylene, divinyl naphthalene, trivinyl benzene, divinyl diphenyl ether, divinyl diphenyl sulfone and isopropenyl vinylbenzene; ethylene glycol dimethacrylate and divinyl sulfide; with the polyvinylidene aromatics, especially divinylbenzene, being most preferred. For the purposes of this invention, the copolymer product of such monoethylenically unsaturated monomers and cross-linking agents will be herein referred to as a "non-treated cross-linked polymer", meaning no subsequent chemical alteration of the copolymer product has taken place.

Although the non-treated cross-linked addition copolymer can be employed in the preparation of the heterogeneous resins of this invention to achieve density increase, improvements in crush strength are generally exhibited in the heterogeneous ion exchange resin when the addition copolymer is halomethylated (preferably, chloromethylated) prior to the imbibition and subsequent polymerization of the halo-olefin. This significant increase in crush strength is believed to be due to the grafting of the olefinic polymer to the halomethyl groups pendant to the cross-linked addition copolymer and to the increased cross-linkage (via methylene bridging) of the copolymer during the polymerization of the olefinic monomer.

Halomethylation of the cross-linked addition copolymer and the halomethylation agents employed in such halomethylation are also well known in the art and reference is made thereto for the purposes of this invention. Illustrative of such are U.S. Pat. Nos. 2,642,417; 2,960,480; 2,597,492; 2,597,493; 3,311,602 and 2,616,811 and *Ion Exchange*, by F. Helfferich, published in 1962 by McGraw-Hill Book Company, New York, all of which are hereby incorporated by reference. In general, the cross-linked addition copolymer is halomethylated by contacting the copolymer with a halomethylating agent and a Freidel-Crafts catalyst such as ferric chloride, zinc chloride or aluminum chloride. Of the known halomethylating agents the halomethylating agents such as bromomethyl methyl ether, chloromethyl methyl ether and a mixture of formaldehyde and hydrochloric acid are preferred, with chloromethyl methyl ether being especially preferred.

Alternatively, the halomethylated cross-linked polymer can be prepared by polymerizing a cross-linking agent as hereinbefore described, with a polymerizable halomethylated monoethylenically unsaturated monomer, advantageously a halomethylated monovinylidene aromatic such as vinylbenzyl chloride. As an example of such polymer and its method of preparation, reference is made to U.S. Pat. No. 2,992,544 (which is hereby incorporated by reference) wherein an ar-(chloromethyl)-styrene and a polyvinyl aromatic hydrocarbon cross-linking agent are copolymerized to form a cross-linked chloromethylated polystyrene.

The resins of the non-treated or halomethylated cross-linked polymers employed for the imbibition and polymerization of the halo-olefin are preferably of the gel type.

Although generally less preferred than the aforementioned non-treated or halomethylated cross-linked polymer, cross-linked polymers having active ion exchange groups such as primary, secondary or tertiary amine; quaternary ammonium; or carboxyl groups can be employed herein. In general, those resins of a cross-linked polymer having active ion exchange groups in ionic form, e.g., quaternary ammonium groups, are preferably macroporous type resins, whereas resins of a cross-linked polymer having non-ionic active ion exchange groups, e.g., 1°, 2° or 3° amine or carboxyl groups, are preferably gel type resins.

Cross-linked addition copolymers bearing pendant 1°, 2° or 3° amine groups, i.e., weak base resins, or cross-linked copolymers bearing pendant quaternary ammonium groups, i.e., strong base resins, are easily prepared from the halomethylated, cross-linked addition copolymers (as described hereinbefore) using conventional techniques well known in the art. Illustrative of such techniques are U.S. Pat. Nos. 2,632,000; 2,616,877; 2,642,417; 2,632,001; 2,992,544 and *Ion Exchange* by F. Helfferich, published in 1962 by McGraw-Hill Book Company, New York; all of which are hereby incorporated by reference. Typically, a weak base ion exchange resin is prepared by contacting the halomethylated polymer with a suitable aminating agent; generally, ammonia or a primary or secondary amine. Representative primary and secondary amines include methylamine, ethylamine, butylamine, cyclohexylamine, dimethylamine, diethylamine and the like. Such method generally comprises heating with reflux a mixture of the polymer and at least a stoichiometric amount of ammonia or the amine to a temperature sufficient to react the ammonia or amine with the benzylic halogen atom. A dispersing agent such as water, ethanol or the like is optionally employed. Advantageously, temperatures between about 25° and 150° C. are employed for the reaction and the reaction is generally complete in from 2 to 6 hours at reflux temperature. Strong base ion exchange resins are prepared in a similar manner using tertiary amines such as trimethylamine, dimethylisopropanolamine, ethyldimethylamine and the like as the aminating agent.

In the preparation of resins of non-treated, haloalkylated or aminated cross-linked addition copolymers by the methods hereinbefore described, the amount of the cross-linking agent most advantageously employed is dependent on a variety of factors including the desired density increase or crush strength improvement and the monomers employed in preparing the cross-linked addition copolymer. In general, the amount of cross-linking agent advantageously employed in said cross-linked addition copolymers is from about 2 to about 12, preferably from about 4 to about 10, weight percent based on the weight of the monomers employed in the preparation of the cross-linked addition copolymer. Advantageously, in resins of a non-treated cross-linked addition copolymer, the cross-linking agent is advantageously employed at from about 1 to about 6, preferably from about 2 to about 4, weight percent based on the weight of monomers employed in preparing the cross-linked polymer. Alternatively, in resins of a halomethylated or aminated cross-linked addition copolymer, the cross-linking agent is advantageously employed at greater than about 4, preferably greater than about 6, weight percent based on the weight of monomers employed in preparing said resin.

In addition, aminated resins useful in the practice of this invention can be the cross-linked addition polymerization product of a suitable nitrogen containing compound. For example, the addition copolymerization product of vinylpyridine or vinylmethylpyridine, a cross-linking agent such as divinylbenzene, divinyl ketone or methylene bisacrylamide, and, optionally, a monovinylidene aromatic such as styrene, is useful as a weak base resin. A strong base resin is easily prepared therefrom by post-converting the resin to quaternary ammonium form. A strong base resin can also be prepared by the addition polymerization of a diallyl dimethylammonium chloride which polymerization may also include a cross-linking agent such as divinyl ketone.

Alternatively, as disclosed by U.S. Pat. Nos. 2,469,684; 2,610,156 and 2,614,085; all of which are hereby incorporated by reference, a weak base resin can be prepared by the condensation reaction of a polyamine, e.g., triethylenetetraamine, with an epoxide, e.g., epichlorohydrin. Similarly, the reaction of a polyamine with formaldehyde or an alkyl halide forms a weak base resin.

Weak acid resins bearing carboxyl groups are easily prepared by conventional techniques well known in the art such as the techniques disclosed by U.S. Pat. Nos. 2,340,110 and 2,340,111, which are hereby incorporated by reference, wherein an organic acid such as acrylic or methacrylic acid is copolymerized with a cross-linking agent such as divinylbenzene or ethylene dimethacrylate. Alternatively, the weak acid resin can also be prepared by the method of U.S. Pat. No. 2,597,437, which is hereby incorporated by reference, wherein an ester of acrylic or methacrylic acid is copolymerized with a cross-linking agent and the copolymerization product subsequently hydrolyzed.

Unless otherwise distinguished, the term "cross-linked polymer" as used herein, refers to non-treated or halomethylated cross-linked polymers as well as cross-linked polymers having active ion exchange groups.

Preferably, the normally solid resins of the cross-linked polymers are prepared in spheroidal bead form, preferably with a diameter from about 0.04 to about 2.4 mm, with a diameter from about 0.3 to about 1.2 mm being more preferred.

The halo-olefins advantageously employed in this invention include vinylidene halide and vinyl halide; wherein the halide is bromine or chlorine or a mixture thereof. Of such halo-olefins, vinylidene chloride, vinylidene chlorobromide and vinylidene bromide are preferred, with vinylidene chloride being most preferred.

The halo-olefin is employed in a sufficient amount such that the density of the heterogeneous ion exchange resin prepared therefrom is measurably increased and/or the crush strength of said heterogeneous resin is measurably improved.

By the term "measurably increase the density of the heterogeneous ion exchange resin" it is meant that the density of said heterogeneous resin is increased by an amount measurable using conventional test methods, e.g., ASTM D-792-60T, when compared to an otherwise identically prepared ion exchange resin which does not have the halo-olefin polymerized therein. Preferably, the density increase is at least about 5 percent, more preferably at least about 10 percent. By way of example, a heterogeneous ion exchange resin exhibits a 5 percent increase in density when it has a density of 1.155 g/cc and are identically prepared ion exchange resin having no halo-olefin polymerized therein has a density of 1.100 g/cc.

By "measurably improve the crush strength of the heterogeneous ion exchange resin" is meant that the crush strength of said heterogeneous resin is increased by an amount measurable using conventional test methods, e.g., the test method described in Note 8 of Table I, when compared to an identical ion exchange resin having no halo-olefin polymerized therein. Preferably, crush strength improvement of the heterogeneous ion exchange resin is at least 2 times, more preferably 4 times the crush strength of an identical cross-linked addition copolymer which has no halo-olefin polymerized therein.

Typically, the amount of the halo-olefin which is most advantageously employed will depend on various factors, including the composition of the resin, i.e., the type and concentration of monomers employed in preparing the cross-linked polymer; the type of said polymer, i.e., whether the cross-linked polymer is non-treated, haloalkylated or a polymer bearing pendant ion active groups, the polymerization conditions and the specific halo-olefin employed. In general, the halo-olefin is advantageously employed at from about 10 to about 50, preferably from about 20 to about 40, most preferably from about 25 to about 35, weight percent, said weight percent being based on the total weight of the ethylenically unsaturated monomer and cross-linking agent employed in preparing the cross-linked polymer.

In the practice of the present invention, the halo-olefinic monomer is imbibed by a normally solid particle, e.g., bead, or the cross-linked polymer and the imbibed monomer subsequently polymerized within the polymer's structure. Although said imbibition and polymerization of the halo-olefin within a non-treated or halomethylated cross-linked polymer may be conducted neat, advantageously, said polymer is advantageously first dispersed in water and the halo-olefin added thereto. Alternatively, the halo-olefin and water may be added simultaneously to the polymer. Generally, water is advantageously employed in amounts between about 50 and about 300, preferably between about 100 and about 200, weight percent, said weight percent being based on the total weight of the ethylenically unsaturated monomer and cross-linking agent.

Alternatively, the imbibition and polymerization of the halo-olefin within a cross-linked polymer having active ion exchange groups in non-ionic form is preferably conducted neat, i.e., no water is employed. In general, following the imbibition of the halo-olefin, the nonionic groups of the cross-linked polymer are advantageously placed in a protonated form prior to the polymerization of the halo-olefin. In general, this is readily accomplished by contacting the cross-linked polymer with sufficient amounts, e.g., amounts sufficient to convert essentially all the 1°, 2° and 3° amine groups to a protonated form, of a suitable acid, preferably an essentially water free form of acid such as glacial acetic or phosphoric acid.

On the other hand, the cross-linked polymer having active ion exchange groups in ionic form is preferably swollen by methanol or a like swelling agent prior to the imbibition of the halo-olefin.

Although, in the preparation of the heterogeneous resin particles, the order of addition of the reactants is not critical, the halo-olefin and a polymerization initiator, either as separate feed streams or as a single mixture, are advantageously added batchwise to the cross-linked polymer or a mixture of said polymer and the aqueous reaction diluent. During said addition, the polymer is advantageously maintained at a temperature below those temperatures at which polymerization of the olefin can occur. Alternatively, the halo-olefin and the initiator can be added continuously to the polymer or mixture of the polymer and the reaction diluent while the polymer is maintained at a temperature sufficient to polymerize the halo-olefin. Batchwise addition of a mixture of the halo-olefin and the polymerization initiator is preferred. During said addition and the polymerization of the halo-olefin, the reactants, i.e., the halo-olefin and the cross-linked polymer, are advantageously maintained as an essentially uniform mixture, typically, by mild agitation.

In the practice of the invention, the cross-linked polymer is swollen by the halo-olefin and the polymerization of the olefin conducted in the presence of a polymerization initiator while the polymer is in this swollen state. Polymerization initiators suitably employed herein include ultraviolet light, high energy radiation such as X-ray radiation, and conventional chemical initiators useful as free radical generators in the polymerization of halo-substituted olefins. Representative of such chemical initiators are the azo compounds, e.g., azobisisobutyronitrile; bisulfites; persulfates; peroxygen compounds, e.g., diisopropyl percarbonate and benzoyl peroxide; and the like.

In general, the polymerization initiator is preferably a peroxygen compound. As the peroxygens have been found to give the greatest crush strength improvements, they are especially preferred as the polymerization initiator when the cross-linked copolymer is in a haloalkylated form.

The initiator is suitably employed in an effective amount, i.e., an amount sufficient to cause polymerization of the halo-olefins. This effective amount is typically dependent on many factors, including the particular initiator and halo-olefin employed. Generally, an effective amount of the initiator is from about 0.05 to about 1.0, preferably from about 0.1 to about 0.3, weight percent, said weight percent being based on the total weight of the halo-olefin employed.

The temperature at which polymerization is conducted is primarily dependent on the type of initiation. For example, with an initiator of diisopropyl percarbonate, the polymerization temperature is advantageously between about 25° and 40° C., whereas with an azobisisobutyronitrile initiator the polymerization is advantageously conducted at from about 60° to about 70° C. In general, with other initiators the polymerization is conducted at a temperature between about 25° and about 100° C., with temperatures between about 40° and about 70° C. being preferred. At these temperatures, polymerization generally requires from about 1 to about 10, preferably from about 2 to about 4, hours.

When prepared from a cross-linked polymer having active ion exchange groups, depending on the nature of said groups, following polymerization of the halo-olefin the resulting heterogeneous resin is a weak or strong base (anion exchange) resin or a weak acid (cation exchange) resin.

Alternatively, when a non-treated or halomethylated cross-linked polymer is employed in the preparation of the heterogeneous resin, following polymerization of the halo-olefin, the resulting heterogeneous resin is a precursor resin useful in the preparation of anion exchange or chelate type resins.

In the preparation of anion exchange or chelate type resins from the heterogeneous precursor resin prepared from a non-treated cross-linked polymer, typically, prior to the attachment of active ion exchange groups thereto, the polymer is advantageously halomethylated by the techniques hereinbefore described. Preferably, ferric chloride is employed as the Freidel-Crafts catalyst in said halomethylation.

Anion exchange resins are prepared from the halomethylated, heterogeneous precursor resin using aminating agents hereinbefore described. As the conditions at which the heterogeneous precursor resin is aminated influences the properties of the resulting aminated resin, i.e., water retention capability and specific gravity, the amination conditions are generally advantageously controlled to achieve the desired properties in the resulting resin. Although the conditions of amination hereinbefore described can be employed in the practice of this invention, in general, the halomethylated, heterogeneous precursor resin is advantageously aminated using relatively milder conditions, with the halomethylated heterogeneous precursor resin being slowly and continuously added to an excess amount of the aminating agent. Generally, said mild conditions for amination consist of times and temperatures which cause a slight darkening of the resin or cause a small percentage of the individual resin beads to blacken. In general, the amination is preferably conducted at temperatures between about 0° and about 100° C., with temperatures between about 10° and about 60° C. being more preferred, and for reaction periods from about 5 to about 120, more preferably from about 15 to about 60, minutes. In general, amination is preferably conducted in a closed pressure vessel.

Optionally, prior to amination, the halo-methylated heterogeneous precursor resin may be swollen by a relatively volatile, normally liquid, swelling agent such as methylene chloride, methanol, dioxane and 1,2-dimethoxyethane. Excess swelling agent is removed by conventional techniques, e.g., filtration and the swollen beads then aminated.

Any dehydrohalogenation of the olefin which may occur during amination or in the subsequent use of the resin can be compensated for by post-halogenating the polymerized halo-olefin using conventional techniques.

Chelate resins are prepared from the halomethylated heterogeneous precursor resins by attaching thereto chelate active exchange groups, e.g., iminodiacetic groups. In general, conventional methods, such as those illustrated in U.S. Pat. No. 2,888,441, which is herein incorporated by reference, wherein a halomethylated precursor polymer is aminated by techniques hereinbefore described and the primary amine containing polymer subsequently reacted with a suitable carboxyl containing compound, e.g., chloroacetic acid, can be employed herein. Alternatively, the precursor polymer can be directly reacted with a suitable amino acid such as diaminoacetic acid or glycine (see, for example, U.S. Pat. Nos. 2,875,162 and 3,337,480) or an aminopyridine such as 2-picolylamine and N-methyl-2-picolylamine (see U.S. Pat. No. 4,031,038), all of said references being hereby incorporated by reference, to form a chelate resin.

The following examples are presented to illustrate the invention and should not be construed to limit its scope. All percentages and parts are by weight unless otherwise indicated.

EXAMPLE 1

To a suitable size flask equipped with an agitator, thermometer and heating and cooling means, is added 352 g of dried, chloromethylated copolymer beads of 94 parts styrene, 6 parts divinylbenzene and 2.6 parts ethylvinylbenzene. The dried chloromethylated beads contain about 19.4 weight percent chlorine, indicating that about 77.5 percent of the benzene rings have chloromethyl substituents. About 195 g of chilled vinylidene chloride is then added to the flask. The resulting mixture is mildly agitated at room temperature for about 30 minutes to allow the beads to swell in the vinylidene chloride. At the end of this period, the mixture is subjected to 5 mrad of gamma-ray radiation at a rate of 0.15 mrad per hour.

At the end of this radiation period, the resulting heterogeneous resin beads are dried and the dried beads found to weigh 497 g and to contain about 41.2 weight percent chlorine. The amount of vinylidene chloride which has been polymerized in the heterogeneous head is calculated to be 42.8 weight percent, based on the weight of the dry heterogeneous resin beads.

The dried beads are swollen by methylene chloride and the swollen beads recovered by filtration, allowing the methylene chloride to remain within the beads. The swollen beads are then placed in a suitable size glass flask equipped with agitator, thermometer and heating and cooling means. To the flask is added 1000 g of a 10 weight percent aqueous solution of trimethylamine and the flask then closed. The resulting mixture is mildly agitated at room temperature, i.e., about 20° C., until the beads darken slightly, which, in this case, takes about 30 minutes. At the end of this period, the methylene chloride is removed from the beads by distillation, adding deionized water at the same rate of the methylene chloride distillation.

The beads are then washed with deionized water, acidified with hydrochloric acid to a pH of about 6 and separated by conventional filtration techniques. The filtered beads weigh 498 g, retain 50.3 percent water and have a wet density of 1.129 g/cc, which corresponds to a 4.5 percent increase in density over similar beads which have no vinylidene chloride polymerized therein. They have a wet volume capacity of 0.94 meq/ml (milliequivalents per milliliter) and dry weight capacity of 2.89 meq/g.

In a similar manner, except that polymerization initiation consists of 10 mrad of gamma-ray radiation, an aminated heterogeneous resin in bead form is prepared from 127 g vinylidene chloride and 70.7 g of chloromethylated beads. The resulting aminated, heterogeneous beads weight 182.5 g, retain 40.6 percent water and have a density of 1.189 g/cc which corresponds to a density increase of about 10 percent. These beads exhibit a wet volume capacity of 0.91 meq/ml and dry weight capacity of 1.94 meq/g.

As evidenced by the foregoing results, heterogeneous anion exchange resin beads prepared from a heterogeneous, chloromethylated resin by the method of this invention exhibit substantially increased densities when compared to conventional anion exchange beads.

EXAMPLE 2

To a suitable size flask similar to the flask of Example 1, is added 200 g of water and 100 g of dried, chloromethylated beads of a copolymer of 98.2 parts styrene and 1.8 parts divinylbenzene. To the flask is then added a chilled mixture of 45 g vinylidene chloride and a polymerization initiator of 0.5 g diisopropyl percarbonate and 0.2 g azobisdimethylvaleronitrile. The resulting mixture is mildly agitated at 25° C. for 20 hours, under a slow nitrogen purge, allowing the beads to imbibe the vinylidene chloride and to polymerize the imbibed vinylidene chloride. At the end of this period, the beads are dried and found to weigh 125 g. The beads are then aminated with trimethylamine in a manner similar to that of Example 1 except that the heterogeneous beads are slowly and continuously added to the aqueous solution of the trimethylamine at 50° C. The resulting aminated, heterogeneous beads are designated Sample No. 1.

In a similar manner, several other samples (Sample Nos. 2-5) of aminated, heterogeneous resin beads are prepared using various amounts of vinylidene chloride as specified in Table I.

As a control (Sample No. C), chloromethylated beads of 98.2 parts styrene and 1.8 parts divinylbenzene having no halo-olefin polymerized therein are aminated following the procedure of Example 1.

The aminated beads are evaluated for percent polyvinylidene chloride, dry weight and wet volume capacity, density and percent water retention. The results of this evaluation are recorded in Table I.

TABLE I

| Sample No. | VeCl₂ Charge % (2) | Poly(VeCl₂) Content, % (3) | Wet Vol. Capacity Meg/ml (4) | Dry Wt. Capacity Meg/g (5) | H₂O In Beads % (6) | Wet Density g/ml (7) | Density Increase, % | Crush Strength g (8) | Crush Strength Improvement (9) |
|---|---|---|---|---|---|---|---|---|---|
| C* | — | — | 1.27 | 4.33 | 55 | 1.078 | — | 0.9 | — |
| 1 | 47 | 39 | 0.91 | 1.59 | 24 | 1.251 | 16.0 | 7.7 | 8.5 |
| 2 | 44 | 28 | 0.83 | 1.58 | 25 | 1.24 | 15.0 | 16.7 | 18.5 |
| 3(1) | 39 | 24 | 1.0 | 1.8 | 30 | 1.121 | 4.0 | 21.4 | 23.8 |
| 4 | 31 | 11 | 1.0 | 2.5 | 27 | 1.169 | 8.4 | 20.2 | 22.4 |

TABLE I-continued

| Sample No. | VeCl₂ Charge % (2) | Poly(VeCl₂) Content, % (3) | Wet Vol. Capacity Meg/ml (4) | Dry Wt. Capacity Meg/g (5) | H₂O In Beads % (6) | Wet Density g/ml (7) | Density Increase, % | Crush Strength g (8) | Crush Strength Improvement (9) |
|---|---|---|---|---|---|---|---|---|---|
| 5 | 29 | 8 | 1.08 | 2.5 | 45 | 1.10 | 2.0 | 12.8 | 14.2 |

*Not an example of this invention (1) A 1 part portion per 100 parts of the dried chloromethylated beads of sodium phosphate is added with the polymerization initiator in the preparation of the heterogeneous beads to precipitate residual iron remaining from the chloromethylation of the beads, which iron causes wastage of the percarbonate polymerization initiator.

(2) Vecl₂ (vinylidene chloride) Charge is reported as a weight percent based on the weight of the chloromethylated copolymer beads.

(3) Poly(VeCl₂) Content refers to amount of vinylidene chloride polymer in the heterogeneous resin reported as a weight percent of poly(VeCl₂) based on the total weight of the heterogeneous resin beads.

(4) Determination of available ion exchange sites per unit weight (dry) which is measured by chloride titration with silver nitrate as described in DOWEX: Ion Exchange published in 1964 by The Dow Chemical Company, pages 37 and 38.

(5) Determination of available ion exchange sites per unit weight (dry) which is measured by chloride titration with silver nitrate as described in DOWEX: Ion Exchange published in 1974 by The Dow Chemical Company, pages 37 and 38.

(6) Water in the beads is the total weight percent water retained by the beads based on the weight of the beads and the water.

(7) Wet density of the heterogeneous beads as determined by ASTM method designated D-792-60T.

(8) Crush strength is the number average crush strength of the individual crush strengths of a sample comprising at least about 10 beads, each bead having a particle diameter of 0.5 mm ± 0.05 mm, wherein crush strength is the total force required to crush each bead as measured by an Instron tester at a cross-head speed of 0.05 cm per minute.

(9) Crush strength improvement is reported as the number by which the crush strength of Sample C must be multiplied to obtain the crush strength of the respective Sample Nos. 1–5.

As evidenced by the data in the foregoing Table, the aminated heterogeneous resin beads prepared from heterogeneous chloromethylated beads by the method of this invention exhibit significant crush strength improvement and density increases. The amount of crush strength improvement and density increase is shown to be dependent on the amounts of the polymerized vinylidene chloride in the heterogeneous resin beads. Said amount of polymerized vinylidene chloride is also shown to influence the other properties of the resin.

EXAMPLE 3

To a suitable size flask similar to the one employed in Example 1, is added 69 g of wet chloromethylated, cross-linked copolymer beads (50 g dry) of 88.5 parts styrene, 8 parts divinylbenzene and 3.5 parts ethylvinylbenzene containing about 18.1 percent chlorine, indicating about 70 percent of the benzene rings have chloromethyl substituents. To the flask is then added a chilled mixture of 21.5 g vinylidene chloride, 0.04 g of diisopropyl percarbonate and 81.1 g of water. The vessel is closed and the resulting mixture agitated mildly with a slow nitrogen purge for 18 hours at 40° C. At the end of this period, the resulting heterogeneous resin beads are recovered by filtration and dried. The dry heterogeneous beads weigh 68.6 g and contain about 23 percent by weight of polymerized vinylidene chloride.

The dried beads are swollen by methylene chloride and the swollen beads recovered by filtration. The swollen beads are then placed in a flask similar to the amination flask used in Example 1. To the flask is then added about 400 g of a 25 weight percent aqueous solution of trimethylamine. The flask is closed and the mixture is mildly agitated for one hour without external heating. During this period the temperature of the flask rises to about 40° C. and the beads darken slightly. The methylene chloride is then removed from the beads.

The resulting aminated, heterogeneous resin is a weak base ion exchange resin in bead form having a wet volume capacity of 1.08 meq/ml, a dry weight capacity of 3.39 meq/g and retains about 29 percent water. The heterogeneous resin beads have a wet density of 1.176 g/cc, an increase of about 8 percent when compared to a similar resin having no vinylidene chloride polymerized therein.

EXAMPLE 4

To a suitable size flask equipped with stirrer, reflux condenser, thermometer and heating and cooling means is added 100 g of a dry, cross-linked copolymer of 96 parts styrene and 4 parts divinylbenzene. To the flask is then added 30 g of vinylidene chloride and 0.5 g of azobisisobutyronitrile. The resulting mixture is mildly agitated for several hours at room temperature and then heated under pressure in a closed vessel for 22 hours at 70° C. At the end of this period, the resulting non-treated heterogeneous resin beads are recovered by filtration, yielding 126 g of beads after drying.

A 100 g portion of the recovered beads are transferred to a suitable size flask similar to the flask employed in the polymerization of the vinylidene chloride. To the flask is added 500 ml of chloromethyl ether. The resulting mixture is mildly agitated for about 60 minutes at a temperature of about 25° C., thereby allowing the heterogeneous resin beads to swell in the chloromethyl ether. At the end of this period, 86 g of zinc chloride is added to the flask. The flask is then heated to about 50° C. and maintained at that temperature for 6.5 hours. Following this period, the flask is cooled to room temperature and the chloromethylated heterogeneous resin beads recovered by filtration. The chloromethyl ether is distilled off and the beads washed with methanol twice.

The chloromethylated heterogeneous resin beads are then aminated following the procedure of Example 2. The resulting aminated, heterogeneous resin is a weak base ion exchange resin in bead form and is designated Sample No. 1.

In a similar manner, other heterogeneous weak base ion exchange resins in bead form (Sample Nos. 2 and 3) are prepared using the various amounts of vinylidene chloride as recorded in Table II. As a control, a similar aminated resin bead is prepared except that no vinylidene chloride is polymerized therein (Sample No. C). Each sample of beads is tested for wet volume and dry weight capacity, density, percent water content and crush strength. The results of this testing are recorded in Table II.

TABLE II

| Sample No. | VeCl$_2$ Charge % (1) | Poly(VeCl$_2$) Content, % (2) | Wet Vol. Capacity Meq/ml (3) | Dry Wt. Capacity Meg/ml (4) | H$_2$O In Beads % (5) | Wet Density g/ml (6) | Density Increase, % |
|---|---|---|---|---|---|---|---|
| C* | — | — | 1.2 | 4.0 | 56.0 | 1.06 | — |
| 1 | 30 | 15.2 | 1.23 | 3.35 | 46.0 | 1.098 | 3.8 |
| 2 | 40 | 14.7 | 1.22 | 3.25 | 44.5 | 1.102 | 4.2 |
| 3 | 50 | 14.6 | 1.22 | 3.15 | 51.0 | 1.115 | 5.4 |

*Not an example of the present invention.
(1)Same as (2) in Table I
(2)Same as (3) in Table I
(3)Same as (4) in Table I
(4)Same as (5) in Table I
(5)Same as (6) in Table I
(6)Same as (7) in Table I
(7)Same as (8) in Table I As evidenced by the data recorded in Table II, heterogeneous weak base resins in bead form having increased density are shown to be effectively prepared by imbibing vinylidene chloride into non-treated heterogeneous resin beads and subsequently attaching anion active exchange groups thereto. The amount of density increase as well as the other resin properties are shown to be dependent on the amounts of the polymerized vinylidene chloride in the heterogeneous resin beads.

EXAMPLE 5

Several aminated, heterogeneous resins in bead form (Sample Nos. 1-4) are prepared from a copolymer of 96 parts styrene and 4 parts divinylbenzene following the procedure of Example 4 except that the various amounts of vinylidene chloride as recorded in Table III are employed and ferric chloride is used as the catalyst (in place of zinc chloride) at the amounts specified in Table III during chloromethylation of the heterogeneous resin beads. As a control, similar aminated resin beads are prepared except that no vinylidene chloride is polymerized therein (Sample No. C). The resulting aminated, resin beads are evaluated for wet volume capacity, wet density and water content, which evaluation results are recorded in Table III.

As evidenced by the data in Table III, the conditions of halomethylating a non-treated halomethylated resin having the halo-olefin polymerized therein are shown to effect the density increases and other properties exhibited by the heterogeneous ion exchange resin beads prepared therefrom.

TABLE III

| Sample No. | VeCl$_2$ Charge % (1) | Poly(VeCl$_2$) Content, % (2) | FeCl$_3$ Charge % (3) | Wet Vol. Capacity Meg/ml (4) | H$_2$O In Beads % (5) | Wet Density g/ml (6) | Density Increase, % |
|---|---|---|---|---|---|---|---|
| C* | — | 44.7 | — | 1.2 | 56 | 1.06 | — |
| 1 | 45 | 44.7 | 34 | 0.59 | 14 | 1.347 | 27 |
| 2 | 45 | 44.7 | 20 | 1.58 | 39 | 1.16 | 9.2 |
| 3 | 30 | 27.9 | 34 | 1.57 | 44 | 1.098 | 3.5 |
| 4 | 30 | 27.9 | 17 | 1.33 | 44 | 1.109 | 4.8 |

*Not an example of the present invention.
(1)Same as (2) in Table I
(2)Same as (3) in Table I
(3)FeCl$_3$ charge is reported as a weight percent based on the total weight of the crosslinked, addition copolymer beads.
(4)Same as (4) in Table I
(5)Same as (6) in Table I
(6)Same as (7) in Table I

EXAMPLE 6

To a 120 cc bottle is added 25 g of vinylidene chloride and 46.7 g of dried strong base ion exchange resin beads in the Cl$^-$ form derived from 88.5 parts styrene, 8 parts divinylbenzene and 3.5 parts ethyl vinylbenzene. The resulting mixture is slowly agitated for about 60 minutes to allow the resin beads to imbibe the vinylidene chloride. At the end of this period, the mixture is exposed to 5 mrad of gamma-ray radiation at a rate of 0.22 mrad/hr. After this treatment, the resulting aminated, heterogeneous resin beads are recovered by filtration and dried. They weigh 46.7 g. The beads have a wet volume capacity of 1.17 meq/ml, and a dry weight capacity of 2.85 meq/g. The beads also have a 34.5 percent water content and a wet density of 1.206 g/cc, which represents an 11 percent density increase when compared to a similar strong base resin in bead form which has no vinylidene chloride polymerized therein.

As shown by this example, a heterogeneous anion exchange resin having an increased density can be effectively prepared by imbibing and subsequently polymerizing a halo-olefin within a cross-linked polymer having anion active exchange groups.

EXAMPLE 7

To a suitable size flask similar to the flask employed in Example 1 is added 250 g of a dry chloromethylated macroporous copolymer resin of 88.7 parts styrene, 6 parts divinylbenzene and 4.3 parts ethyl vinylbenzene. To the flask is then added a chilled mixture of 250 g of vinylidene chloride and 1.0 g of azobisisobutyronitrile. The resulting mixture is mildly agitated for 4 hours at room temperature to allow the resin to imbibe the vinylidene chloride. At the end of this period, the flask is heated to 65° C. and maintained at this temperature for 16 hours. At the end of this period, the beads are dried and the dried beads found to weigh 500 g. The beads are then aminated with trimethylamine in a manner similar to Example 1. The aminated beads are designated Sample No. 1.

A 20 g portion of the resulting aminated beads are placed in a transparent 60 cc bottle containing an open vial of liquid bromine. The bottle is placed in direct sunlight for a period of about 8 hours. During this period, the beads darken and some hydrogen bromide is formed. After this period, the beads are alternately washed with a 5 weight percent solution of hydrochloric acid and water until the rinse water contains essentially no halide ion. The beads are then recovered using conventional techniques. The recovered, post-brominated beads are designated Sample No. 2.

Both Sample Nos. 1 and 2 and a control (Sample No. C) are evaluated for percent polymerized vinylidene chloride, dry weight and wet volume capacity, density and percent water retention. The results of this evaluation are recorded in Table IV.

As evidenced by the data in Table IV, the heterogeneous resin beads are easily post-brominated, i.e., following amination of the copolymer bead, to produce an ion exchange resin having a further increased density.

TABLE IV

| Sample No. | Poly(VeCl$_2$) Content, % (1) | Wet Vol. Capacity Meq/ml (2) | Dry Wt. Capacity Meq/g (3) | H$_2$O In Beads % (4) | Wet Density g/ml (5) | Density. Increase, % |
|---|---|---|---|---|---|---|
| C* | — | 1.27 | 4.33 | 55 | 1.078 | — |
| 1 | 39 | 0.9 | 2.91 | 45.7 | 1.15 | 6.9 |
| 2 | 39 | 0.79 | 2.11 | 38.7 | 1.33 | 23.5 |

*Not an example of this invention.
(1)Same as (3) in Table I
(2)Same as (4) in Table I
(3)Same as (5) in Table I
(4)Same as (6) in Table I
(5)Same as (7) in Table I

EXAMPLE 8

To a suitable size flask similar to the flask employed in Example 1 is added 70 g of dry weak base resin beads of a copolymer of 88.7 weight percent styrene, 6 weight percent divinylbenzene and 4.3 weight percent ethyl vinylbenzene which copolymer bears dimethylaminomethyl groups. To the flask is then added a chilled mixture of 30 g of vinylidene chloride and 0.06 g azobisisobutyronitrile. The mixture of vinylidene chloride is quickly imbibed by the beads. Following this imbibition, 15.1 g of glacial acetic acid is added to the flask to convert the dimethylaminomethyl groups to a protonated form. The imbibed vinylidene chloride is polymerized by heating the beads for fifteen hours at about 60° C. After this period, the beads are dried and found to contain 24.3 percent, by weight of polymerized vinylidene chloride. The beads are rinsed with a 5 weight percent hydrochloric acid solution and then washed with water until the rinse water is essentially halide free. The resin is found to contain 48 percent water, a wet volume capacity of 1.38 meq/ml and a specific gravity of 1.16, which represents a density increase of about 8 percent over a similar weak base resin having no vinylidene chloride polymerized therein.

What is claimed is:

1. A heterogeneous ion exchange resin of a cross-linked polymer of a monoethylenically unsaturated monomer and a cross-linking agent of a polyethylenically unsaturated monomer having a vinyl halide or vinylidene halide monomer polymerized within the structure thereof in an amount sufficient to increase the density and/or improve the crush strength of the resin, said cross-linked polymer bearing a plurality of pendant ion active exchange groups.

2. The heterogeneous resin of claim 1 wherein the monoethylenically unsaturated monomer is a monovinylidene aromatic and the polyethylenically unsaturated monomer is a polyvinylidene aromatic.

3. The heterogeneous resin of claim 2 wherein the monovinylidene aromatic is styrene, vinyltoluene, ethylvinylbenzene or vinylnaphthalene; the polyvinylidene aromatic is divinylbenzene, divinyltoluene, divinylxylene or divinylnaphthalene; and the halo-substituted olefin is vinylidene chloride.

4. The heterogeneous ion exchange resin of claim 1 or 3 wherein the heterogeneous resin is an anion exchange resin.

5. The heterogeneous resin of claim 4 wherein the active ion exchange groups are primary, secondary or tertiary amine groups and the heterogeneous resin is a weak base ion exchange resin.

6. The heterogeneous resin of claim 4 wherein the active ion groups are quaternary ammonium groups and the heterogeneous resin is a strong base ion exchange resin.

7. The heterogeneous resin of claim 1 or 3 wherein the heterogeneous resin is a chelate type resin.

8. The heterogeneous resin of claim 1 or 3 wherein the heterogeneous resin is a weak acid ion exchange resin.

9. The heterogeneous resin of claim 1 wherein the halo-substituted olefin is employed in an amount sufficient to increase the density of the ion exchange resin by at least about 5 percent.

10. The heterogeneous anion exchange resins of claim 4 wherein the resin is a gel type anion exchange resin and the density of said resin is at least about 1.13 grams per cubic centimeter.

11. A method for preparing the heterogeneous ion exchange resin of claim 1, said method comprising the steps of:
 (a) imbibing the halo-substituted olefinic monomer within the cross-linked polymer,
 (b) polymerizing the imbibed halo-substituted olefinic monomer, and
 (c) attaching ion active exchange groups to the polymer either before step (a) or after step (b).

12. The method of claim 11 wherein the halo-substituted olefinic monomer is imbibed by a nontreated, cross-linked addition polymer of a monovinylidene aromatic and a polyethylenically unsaturated monomer copolymerizable with the monovinylidene aromatic.

13. The method of claim 12 wherein the resulting heterogeneous ion exchange resin is an anion exchange resin and the active anion exchange groups are attached to the non-treated, cross-linked polymer having the imbibed olefin polymerized therein by the steps of (a) halomethylating the cross-linked polymer and (b) subsequently aminating the halomethylated heterogeneous resin.

14. The method of claim 13 wherein the halomethylation comprises contacting the heterogeneous resin with a halomethylating agent and ferric chloride.

15. The method of claim 11 wherein the halosubstituted olefin is imbibed by a halomethylated, crosslinked addition polymer.

16. The method of claim 15 wherein the heterogeneous ion exchange resin is an anion exchange resin and the active ion exchange groups are attached to the polymer by aminating the halomethylated, crosslinked polymer having the halo-substituted olefin polymerized therein.

17. The method of claim 13 or 16 wherein aminating the heterogeneous halomethylated cross-linked addition polymer comprises contacting the copolymer in a closed pressure vessel with ammonia or a primary, secondary or tertiary amine at a temperature from about 0° to about 100° C. and for a reaction period of about 15 to about 120 minutes.

18. The method of claim 17 wherein and the heterogeneous ion exchange resin is a weak base ion exchange resin.

19. The method of claim 17 wherein the heterogeneous ion exchange resin is a strong base ion exchange resin.

20. The method of claim 11 wherein the halosubstituted olefinic monomer is imbibed by a crosslinked polymer bearing primary, secondary or tertiary amine active ion exchange groups, the amine groups being converted to a protonated form following imbibition of the halo-substituted olefinic monomer but prior to the polymerization thereof.

21. The method of claim 20 wherein the amine groups are converted to a protonated form by contacting the cross-linked polymer with sufficient amounts of an anhydrous acid.

* * * * *